No. 877,617.
PATENTED JAN. 28, 1908.
C. B. VAN HORN.
WHEEL.
APPLICATION FILED SEPT. 27, 1906.
2 SHEETS—SHEET 1.
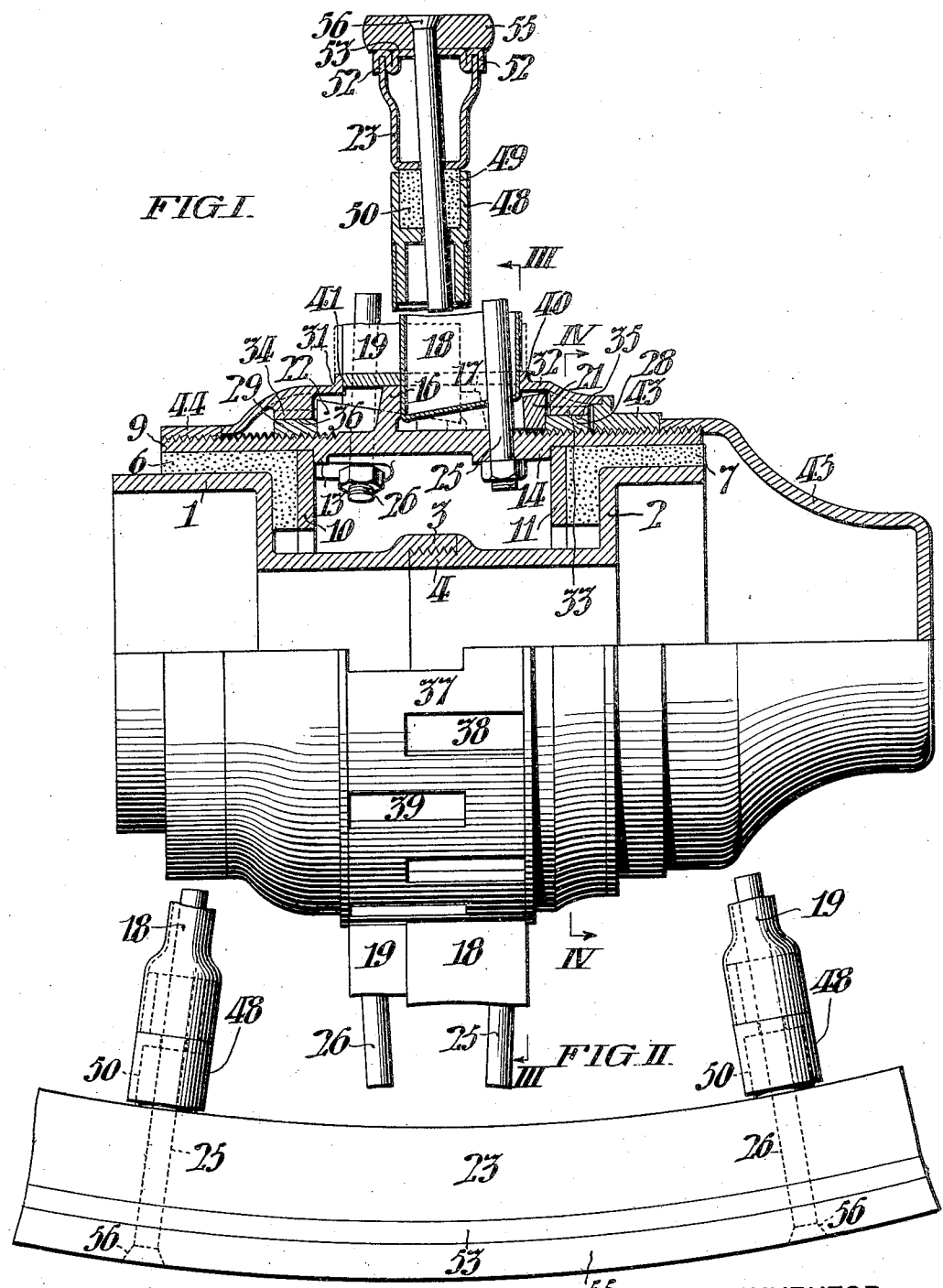
WITNESSES:
John C. Bergner
Thomas H. Kerr
INVENTOR:
CHARLES B. VAN HORN,
by Arthur E. Paige
Atty.

No. 877,617.　　　　　　　　　　　　　　　PATENTED JAN. 28, 1908.
C. B. VAN HORN.
WHEEL.
APPLICATION FILED SEPT. 27, 1906.
2 SHEETS—SHEET 2.
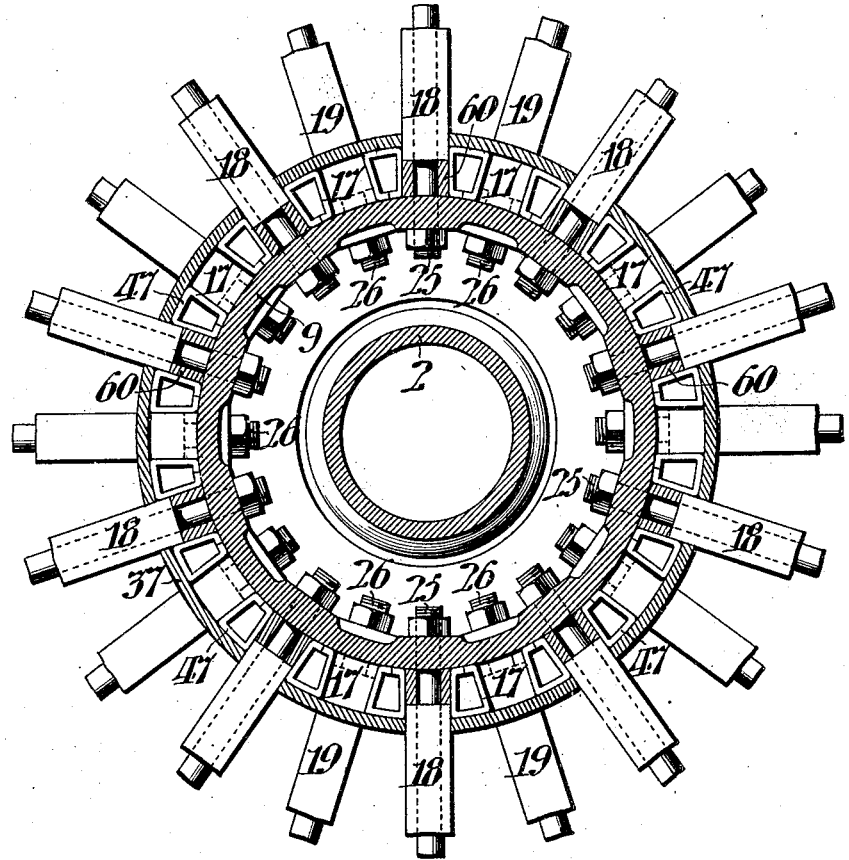
FIG. III.
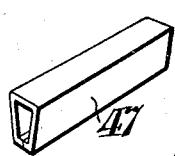
FIG. V.
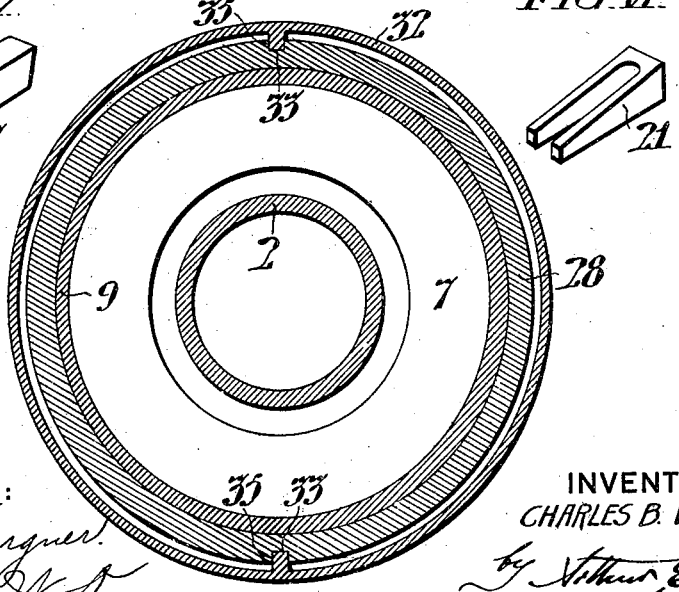
FIG. IV.
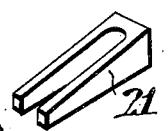
FIG. VI.
WITNESSES:
John C. Bergner.
Thomas W. Kerr.
INVENTOR:
CHARLES B. VAN HORN,
by Arthur E. Paige
Atty.

UNITED STATES PATENT OFFICE.

CHARLES B. VAN HORN, OF PHILADELPHIA, PENNSYLVANIA.

WHEEL.

No. 877,617.  Specification of Letters Patent.  Patented Jan. 28, 1908.

Application filed September 27, 1906. Serial No. 336,450.

*To all whom it may concern:*

Be it known that I, CHARLES B. VAN HORN, of Philadelphia, in the State of Pennsylvania, have invented a certain new and useful Improvement in Wheels, whereof the following is a specification, reference being had to the accompanying drawings.

As hereinafter described, my invention comprises a wheel hub consisting of opposed complementary sections arranged to detachably engage spokes arranged in two circumferential series in staggered relation, wedging means arranged to thrust said spokes individually outward into engagement with a felly, and rods respectively extending through the spokes in connection with the wheel tire and with a cylindrical sleeve forming part of the wheel hub, the arrangement being such that the felly and hub are connected under compression by the spokes and under tension by the rods extending through the latter.

My invention comprises the various novel features of construction and arrangement hereinafter more definitely specified.

In the drawings, Figure I, is a fragmentary diametrical sectional view of a wheel embodying my improvements, the lower half of the hub being shown in elevation. Fig. II, is a fragmentary side elevation of the felly and spokes connected therewith. Fig. III, is a transverse sectional view of said hub, taken on the line III, III, in Fig. I. Fig. IV, is a transverse sectional view of said hub taken on the line IV, IV, in Fig. I. Fig. V, is a perspective view of one of the spacing blocks which extend between the spokes in the hub as indicated in Fig. III. Fig. VI, is a perspective view of one of the wedges which extend beneath the inner ends of the spokes as indicated in Figs. I and III.

In said figures; the axle box comprises two axially opposed members 1, and 2, which are connected by screw threaded flanges 3, and 4, as shown in Fig. I. Said axle box is provided at its opposite ends with rings 6, and 7, of elastic material such as rubber or vulcanized fiber, which support the hub sleeve 9 and abut against the annular plates 10, and 11, which are supported by the shoulders 13, and 14, in said sleeve, and serve to prevent axial displacement of said rings 6, and 7, with respect to the axle box members 1, and 2. Said sleeve 9, is provided with two circumferential series of spoke abutments respectively indicated at 16, and 17, in Fig. I; the abutments of the respective series being disposed in staggered relation in respective engagement with the inner ends of the two series of spokes 18, and 19. Said abutments serve to prevent axial displacement of said spokes 18, and 19, when the wedges 21, and 22, are thrust axially beneath the inner ends of said spokes to compress the latter outwardly into engagement with the felly 23. Said wedges 21, and 22, are bifurcated as indicated in Fig. VI, so as to project on opposite sides of the rods 25, and 26, which extend through the respective spokes 18, and 19. Said series of wedges 21, and 22, are adjustable axially toward each other, by respective wedge adjusting rings 28, and 29, which are screw threaded in engagement with the hub sleeve 9, and, said rings 28, and 29, are engaged by the hub casing rings 31, and 32, which are respectively provided with lugs 33, and 34, engaging corresponding recesses 35, and 36, in the respective rings 28, and 29. Said hub casing rings 31, and 32, hold between them the spoke socket ring 37, which is provided with two circumferential series of recesses 38, and 39, disposed in staggered relation on its respectively opposite edges, as shown in elevation in the lower portion of Fig. I. It is to be understood that said ring 37, holds the two series of spokes 18, and 19, in properly spaced relation, circumferentially, and said spokes are prevented from axial displacement in the hub by the rings 31, and 32, which close the ends of the respective recesses 38, and 39. As indicated at 40, and 41, in Fig. I, said rings 31, and 32, may be provided with flanges extending transversely with respect to the wheel axis to further support the inner ends of the spokes 18, and 19. Said hub casing rings 31, and 32, are retained in proper position with respect to the hub by the locking rings 43, and 44, which are respectively in screw threaded engagement with the sleeve 9, at the opposite ends thereof. Said sleeve 9, is also conveniently provided with the hub cap 45, which is in screw threaded engagement with the outer end of said sleeve and arranged to cover the outer end of the axle, and the parts connected therewith. Said spokes 18, and 19, are separated by spacing blocks 47, which as indicated in Figs. III and V, are conveniently formed of angular tubes of pressed sheet metal which extend between the sleeve 9, and spoke socket ring 37.

The outer end of each of said spokes 18, and 19, is provided with a plug 48, having a recess 49, in its outer end containing a block of resilient material 50, such as rubber or vulcanized fiber. As indicated in Fig. I, said blocks 50, extend slightly beyond the plugs 48, so as to be interposed between the spokes and felly 23, and minimize the shocks transmitted from one to the other.

As indicated in Fig. I, the felly 23, is U shaped in cross section, and its outer edges are seated in channels 52, which extend circumferentially in the rim 53, which latter is conveniently formed of pressed sheet metal. The tire 55, is fitted upon said rim 53, and retained thereon by the heads 56, of the rods 25, and 26, which extend therethrough as indicated in Fig. I.

It may be observed that the inner ends of said spokes 18, and 19, are of rectangular cross section, corresponding with the recesses 38, and 39, indicated in Fig. I, and, that the plugs 48, and the outer ends of the spokes 18, and 19, in which they are fitted, are cylindrical, but that the spokes intermediate of their inner rectangular ends and outer circular ends are conveniently made of elliptical cross section, the longer axis of the ellipse being parallel with the axis of the wheel.

I do not desire to limit myself to the precise construction and arrangement herein described, as various modifications may be made therein without departing from the scope of the following claims.

I claim:—

1. A wheel comprising a hub and felly, and means connecting said hub and felly under compression and under tension, comprising hollow spokes; rods extending through the respective spokes; means within said hub arranged to compress said spokes radially outward, and means arranged to tensely strain said rods, substantially as set forth.

2. A wheel comprising a hub and felly, and means connecting said hub and felly under compression and under tension, comprising hollow spokes; means carried by the hub arranged to compress said spokes radially outward; rods extending through the respective spokes; and means arranged to tensely strain said rods, substantially as set forth.

3. A wheel comprising a hub and felly, having a hollow metal spoke connecting said hub and felly; a block of resilient material interposed between said spoke and felly; a rod extending through said spoke in connection with said felly and said hub; and, means arranged to tensely strain said rod, substantially as set forth.

4. A wheel comprising a hub and felly, having a hollow sheet metal spoke connecting said hub and felly; a block of resilient material interposed between said spoke and felly; a rod extending through said spoke in connection with said felly and said hub; and, means within said hub, arranged to tensely strain said rod, substantially as set forth.

5. In a wheel, comprising a hub, a felly, and spokes connecting them, the combination with an axle box comprising axially alined sections having flanges in screw threaded engagement; of rings of resilient material respectively encircling said axle box sections; a sleeve supported by said resilient rings; shoulders on said sleeve; annular plates supported by said shoulders, forming abutments for said resilient rings; two circumferential series of spoke abutments on the exterior of said sleeve; a spoke socket ring supported by said spoke abutments, and comprising two circumferential series of recesses disposed in staggered relation in its respectively opposite edges; two series of wedges supported by said sleeve, engaging the inner ends of the spokes, between said sleeve and spoke socket ring; wedge adjusting rings in screw threaded engagement with said sleeve and respectively in operative relation with said two series of wedges; two casing rings respectively covering said wedge adjusting rings and engaged therewith; and, locking rings in screw threaded engagement with said sleeve and respectively in operative relation with said casing rings, substantially as set forth.

6. In a wheel, comprising a hub, the combination with a felly of U shaped cross section having its free edges turned outwardly; of a rim formed of sheet metal comprising circumferential channels fitted to the edges of said felly; a tire fitted to said rim; rods extending through said tire, rim and felly, maintaining them in assembled relation; and, hollow spokes inclosing said rods, maintaining said felly in concentric relation with said hub, substantially as set forth.

7. A wheel comprising a hub and felly, and means connecting said hub and felly under compression and under tension, comprising hollow spokes; rods extending through the respective spokes in eccentric relation therewith; and means arranged to tensely strain said rods, substantially as set forth.

8. A wheel comprising a hub and felly, having a hollow metal spoke connecting said hub and felly; a rod extending through said spoke in connection with said felly and said hub; means within said hub arranged to compress said spokes radially outward, and, means arranged to tensely strain said rod, substantially as set forth.

9. A wheel comprising a hub and felly, having a circumferential series of hollow sheet metal spokes connecting said hub and felly; rods extending through the respective spokes in connection with said felly and said hub, and means within said hub arranged to compress said spokes radially outward, substantially as set forth.

10. A wheel comprising a hub and felly;

having a circumferential series of hollow sheet metal spokes connecting said hub and felly; rods extending through the respective spokes in connection with said felly and said hub, and means within said hub arranged to compress said spokes radially outward, comprising individual wedges respectively engaged with the individual spokes, substantially as set forth.

11. A wheel comprising a hub and felly, having a circumferential series of hollow sheet metal spokes connecting said hub and felly; rods extending through the respective spokes in connection with said felly and said hub, and means within said hub arranged to compress said spokes radially outward, comprising individual wedges bifurcated to embrace said rods, and respectively engaged with the individual spokes, substantially as set forth.

In testimony whereof, I have hereunto signed my name at Philadelphia, Pennsylvania, this 22nd day of September, 1906.

CHARLES B. VAN HORN.

Witnesses:
ARTHUR E. PAIGE,
ANNA F. GETZFREAD.